United States Patent [19]
Fenrich et al.

[11] Patent Number: 5,321,768
[45] Date of Patent: Jun. 14, 1994

[54] SYSTEM FOR RECOGNIZING HANDWRITTEN CHARACTER STRINGS CONTAINING OVERLAPPING AND/OR BROKEN CHARACTERS

[75] Inventors: Richard K. Fenrich, Tonawanda; Sargur N. Srihari, Williamsville, both of N.Y.

[73] Assignee: The Research Foundation, State University of New York at Buffalo, Buffalo, N.Y.

[21] Appl. No.: 951,287

[22] Filed: Sep. 25, 1992

Related U.S. Application Data
[63] Continuation-in-part of Ser. No. 949,790, Sep. 22, 1992.

[51] Int. Cl.$^5$ .............................................. G06K 9/34
[52] U.S. Cl. ........................................ 382/9; 382/57
[58] Field of Search ........................... 382/9, 13, 1, 57

[56] References Cited

U.S. PATENT DOCUMENTS

| | | | |
|---|---|---|---|
| 3,525,074 | 8/1970 | Cutaia | 382/9 |
| 4,562,594 | 12/1985 | Bednar et al. | 382/9 |
| 4,799,271 | 1/1989 | Nagasawa | 382/57 |
| 4,998,285 | 3/1991 | Suzuki et al. | 382/9 |
| 5,058,182 | 10/1991 | Kuan et al. | 382/25 |
| 5,138,668 | 8/1992 | Abe | 382/9 |

OTHER PUBLICATIONS

E. Lecolinet et al. "A New System for Automatic Segmentation & Recognition of Unconstrained Handwritten Zip Codes", *The 6th Scandanavian Conference on Image Analysis*, Jun. 1989.

M. Shridhar et al. "Recognition of Isolated and Simply Connected Handwritten Numerals", *Pattern Recognition*, vol. 19, pp. 1-12.

R. Fenrich, et al. "Segmenting Diverse Quality Handwritten Digit Strings in Near Real-Time", *United States Postal Service Advanced Technology Conference*, 1990, pp. 523-537.

N. Otsu, "A Threshold Selection method from Gray-Level Histograms", *IEEE Transactions on Systems, Man, and Cybernetics*, vol. SMC-9, No. 1, Jan. 1979, pp. 62-66.

J. Schurmann, "A Multifond Word Recognition System for Postal Address Reading", *IEEE Transactions on Computers*, vol. C-27, pp. 721-732 No. 8, Aug. 1978.

L. Lam et al. "Structural Classification and Relaxation Matching of Totally Unconstrained Handwritten Zip-Code Numbers", *Pattern Recognition*, vol. 21, No. 1, pp. 19-31, 1988.

R. G. Casey, "Moment Normalization of Handprinted Characters", *IBM J. Res. Develop.*, Sep. 1970, pp. 548-557.

R. Fenrich, "Segmentation of Automatically Located Handwitten Words", *International Workshop on Fontics in Handwritten Recognition*, Sep. 23-27, 1991.

*Primary Examiner*—Leo H. Boudreau
*Assistant Examiner*—L. Prikockis
*Attorney, Agent, or Firm*—Nixon, Hargrave, Devans & Doyle

[57] ABSTRACT

A system (method and apparatus) for handwritten character recognition recognizes characters within strings of text despite the presence of overlapping or disjointed characters. A string is segmented into discrete characters by removing noise and punctuation, joining the disconnected components of characters and splitting probable overlapping characters. After joining and splitting (as required), character recognition is performed to recognize characters in the string. Recognized characters are removed and the string is split in order that more characters can be recognized. If unrecognized characters remain in the string, the process is repeated. The joining and splitting operations are repeated until all subsequent characters in the string have been either recognized or determined to be unrecognizable.

29 Claims, 15 Drawing Sheets

4045 E
4 0 4 5 E
FIG. 8a
P.O.
P O
FIG. 8b
5930
5 9 3 0
FIG. 8c
Star
S t a r
FIG. 8d
522nd
5 2 2 n d
FIG. 8e
857
8 5 7
FIG. 8f
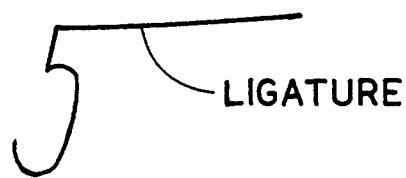
FIG. 9a
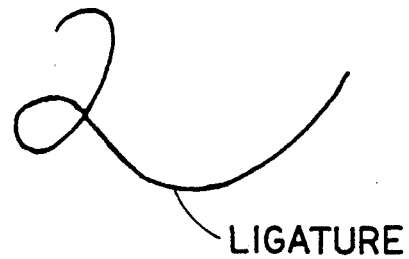
FIG. 9b

SYSTEM FOR RECOGNIZING HANDWRITTEN CHARACTER STRINGS CONTAINING OVERLAPPING AND/OR BROKEN CHARACTERS

This application is a continuation-in-part of application U.S. Ser. No. 949,790, filed Sep. 22, 1992.

In accordance with 37 CFR 1.96, a microfiche appendix is to be considered a portion of the entire "written description" of this invention in conformance with 35 U.S.C. 112. The appendix includes 3 microfiche having 283 frames.

The U.S. Postal Service has rights in this invention pursuant to Contract No. 104230 92-H-3768.

FIELD OF THE INVENTION

The present invention relates to the field of character recognition, and more particularly to a system (method and apparatus) for recognizing characters in a string of handwritten text containing overlapping and/or broken characters by segmenting the string into discrete characters.

BACKGROUND OF THE INVENTION

Techniques for the machine recognition of printed and handwritten characters (i.e., digits and non-digits alike) have existed for several years. For the most part, however, techniques for recognition of machine printed characters are not suitable for application to handwritten characters. This is because the recognition of handwritten characters presents several problems not encountered in the recognition of machine printed characters. First, handwritten characters, unlike those printed by a machine, often are not of uniform size within a block of text, or even within the same word. Thus, heuristic techniques for recognizing machine printed characters which rely to varying degrees on relative sizes of characters within a string are ill-suited for use in the recognition of unconstrained handwritten text. Second, letters and/or numbers constituting a string of handwritten text often overlap with one another, making character identification techniques based upon the recognition of discrete characters useless. Further, various handwriting styles often result in characters having disconnected components—another situation machine printed text recognition techniques are not equipped to handle. Finally, the abundance of different handwriting styles renders the recognition of handwritten words a computationally more substantial task than machine printed text recognition.

Various methods for the recognition of handwritten characters have been proposed, for instance, in E. Lecolinet and J. Moreau, "A New System for Automatic Segmentation & Recognition of Unconstrained Handwritten ZIP Codes," The 6th Scandinavian Conference on Image Analysis, June 1989; and in M. Sridhar and A. Badreldin, "Recognition of Isolated and Simply Connected Handwritten Numerals", Pattern Recognition 19:1-12, 1986. These methods are not equipped to deal with overlapping characters within a string of characters having disconnected components, because none is able to isolate overlapping characters for recognition when the strings in which they occur are of varying length. In order to operate effectively in the recognition of unconstrained handwritten text, i.e., handwritten text not confined to a particular location or size, the recognition method must be capable of discerning the identity of individual characters despite their being connected to other characters or having disconnected components.

Another method for recognizing handwritten text involves a method for recognizing strings of numbers. See R. Fenrich and S. Krishnamoorthy, "Segmenting Diverse Quality Handwritten Digit Strings in Near Real Time," United States Postal Service Advanced Technology Conference, 1990. This method was designed particularly for use in the recognition of handwritten numbers in ZIP Codes on mail pieces. Because the number of digits in any ZIP Code necessarily is five or nine, the method begins with the assumption that the string contains either five or nine characters. By making this assumption, the aspect ratio of the character string (i.e., the ratio of string length, in pixels, to string height, in pixels) can provide sufficient information for the determination of whether the string has one or the other of the two possible string lengths. The method does not handle strings of varying length, such as the street address on a mail piece or the courtesy amount on a check. Aspect ratio is much less useful for determining word length in such situations. Further, the presence of punctuation marks in street address lines can cause inaccurate estimates of word length.

SUMMARY OF THE INVENTION

It is an object of the invention to provide an improved system (method and apparatus) which addresses the foregoing problems which arise from the ways words or strings of characters are handwritten.

It is a more specific object of the invention to provide an improved handwritten character recognition system, which system is able to recognize handwritten character strings (letter or number or both) of varying length despite the presence of characters which overlap within the word or string, characters having disconnected components or characters of varying sizes (height and length).

Briefly described, a system carries out the following operations to recognize characters in a string of handwritten characters in accordance with the invention. The operations are carried out as follows: (a) a pattern or array of pixels corresponding to the string is obtained; (b) next, the number of characters contained in the string is estimated; (c) the array is then partitioned into a plurality of groups of rows of pixels; (d) each of the groups of rows is then vertically partitioned in order to separate occupied columns (i.e., having a foreground pixel) within each of the groups of rows from unoccupied columns (having no foreground pixel); (e) if a plurality of occupied columns are contiguous, they are designated as a component, the components thereby forming a discrete pattern; (f) non character components are removed from each group; (g) a character recognition operation is then performed on the components; (h) components are then removed from the array if they have a predetermined confidence level of forming one of the stored images; and (i) the number of characters in the string is reestimated.

BRIEF DESCRIPTION OF THE DRAWINGS

FIG. 8(a)-(f) are graphic depictions of examples of results obtained from the segmentation operation in accordance with the present invention.

FIG. 9(a)-(b) are examples of common ligatures encountered in handwritten text.

DETAILED DESCRIPTION

Figure 1:
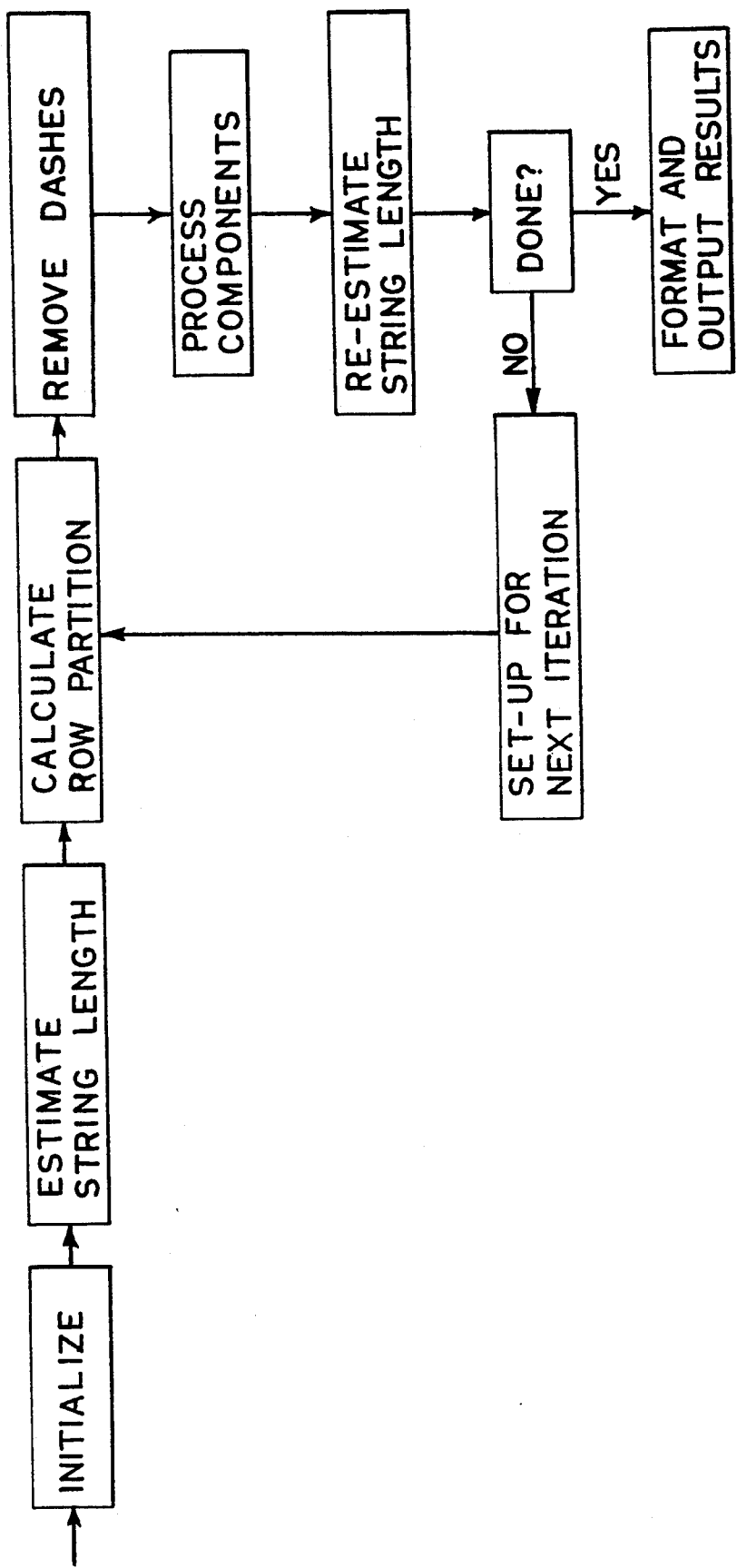
FIG. 1 is a flow diagram showing generally how the present invention can be implemented.

Referring to FIG. 1, each of the operations for recognizing handwritten words used in an exemplary implementation is shown. These operations are performed iteratively until termination criteria are satisfied and may be grouped as follows:

I. Preprocessing;
II. Partitioning;
III. Removal of Dashes; and
IV. Processing.

The operations will be discussed in the order stated.

PREPROCESSING

Initially, a string of characters is digitized by a scanning device. The resulting digital representation of the string is stored in a memory device as a pixel map, each pixel being represented by an 8 bit byte indicative of the pixel's gray-scale level. The pixel map is then thresholded using a known thresholding procedure to yield a binary bit-mapped image of the character string. A suitable technique is described in N. Otsu, "A Threshold Selection Method from Gray Level Histograms," IEEE Transactions on Systems, Man, and Cybernetics, Vol. SMC 9, January 1979, which is incorporated herein by reference. To threshold, foreground pixels, i.e., pixels having a gray-scale level below a predetermined value, are assigned a value of 0, i.e., logic zero, and background pixels are assigned a value of 255, i.e., logic one.

After thresholding, the number of characters in the string is estimated. In a preferred embodiment of the present invention, three methods for word length estimation can be employed: estimation can be forced to return a predetermined number of characters as the result; the estimation can be forced to choose between two predetermined numbers, e.g., between five or nine characters (useful in ZIP Code recognition, since ZIP Codes necessarily must have five or nine characters); or the estimation can be performed without prejudice.

If either of the latter two estimation options is chosen, an estimated word length, in number of characters, is calculated using the aspect ratio of the image. A table of empirically determined aspect ratios for various string lengths, such as Table I, is consulted to arrive at a best guess as to word length.

If estimation is unconstrained, as in the third option, the resulting character estimation can be any number according to Table I, which lists the aspect ratios for strings of handwritten text containing various numbers of characters.

If the number of characters to be estimated is constrained to a choice between 5 and 9, the estimated length will be 5 if the aspect ratio is closer to the range shown in Table I representing a five digit word than it is to the range representing a nine digit word. Otherwise, the estimated length will be nine. The number chosen depends on which of the two numbers is closest to the results of an aspect ratio determination based on Table I.

TABLE I

| Aspect Ratio | # of Characters |
|---|---|
| 0.00-0.34 | 1 |
| 0.34-1.02 | 2 |
| 1.02-1.70 | 3 |
| 1.70-2.38 | 4 |
| 2.38-3.06 | 5 |
| 3.06-3.74 | 6 |
| 3.74-4.42 | 7 |
| 4.42-5.10 | 8 |
| 5.10-5.78 | 9 |
| 5.78-6.46 | 10 |
| 6.46-7.14 | 11 |

PARTITIONING

Figure 2:
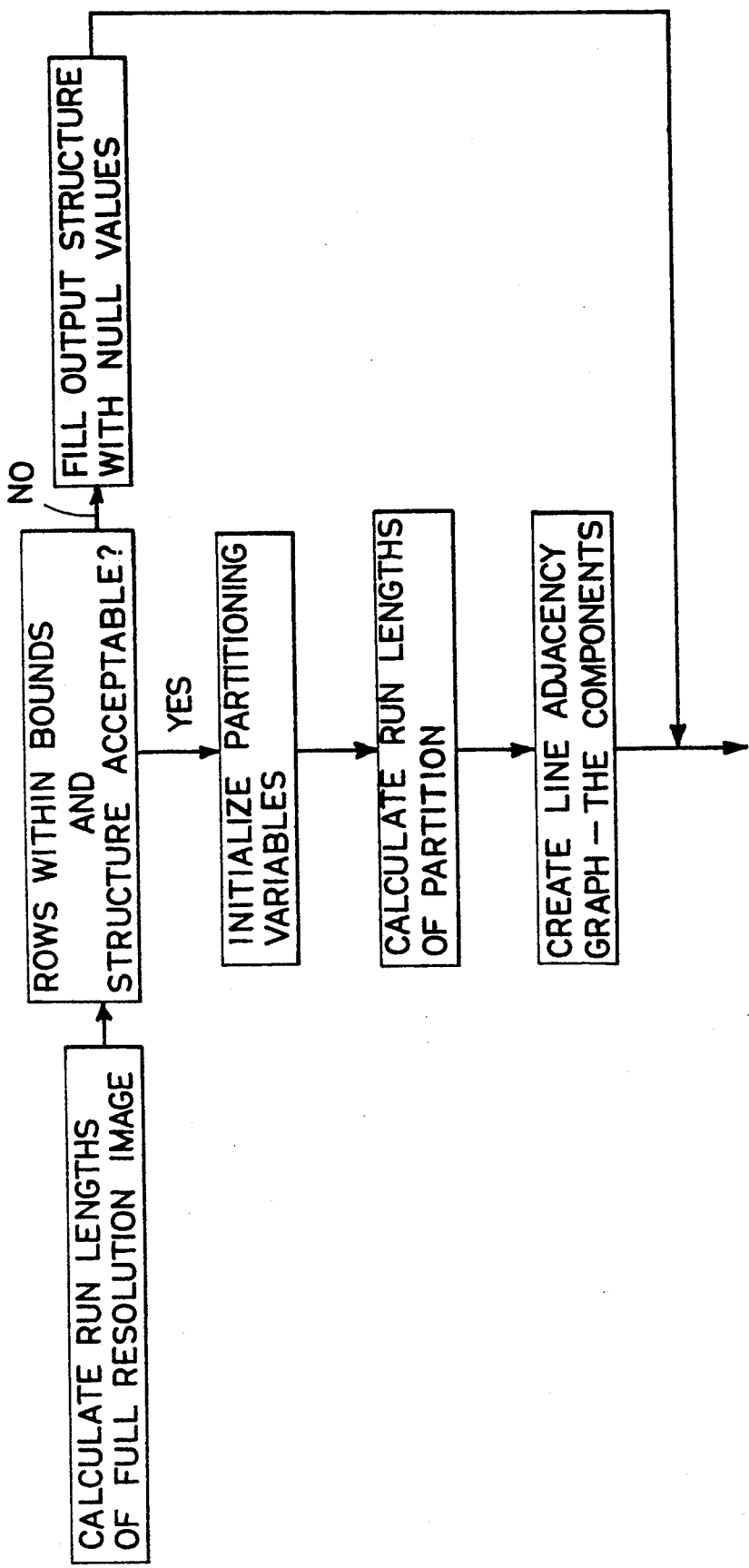
FIG. 2 is a more detailed flow diagram of the operation of calculating row partitions in the string to be recognized.

Once the number of characters has been estimated, the thresholded pixel image is partitioned into a plurality of rows of pixels. Partitioning of rows is performed as follows. First, referring to FIG. 2, the run lengths in the full resolution image are determined. Each set of contiguous foreground pixels is a run. If more than half of the rows in the image have 23 or more runs, the segmentation process is aborted. Likewise, if there are more than 1,600 rows in the image, the segmentation process is aborted. If the segmentation is not aborted and a row has more than 100 runs, the number of runs in that row is truncated to 100. The term "aborted" refers to the process of filling the structure representing the image with null values and skipping the partitioning process during that iteration. If partitioning is enabled, partitioning variables d and r are initialized, where r is the number of rows in the string image, and d is the rate at which the number of sets in the row partition increases. In a preferred embodiment, $d=4$. Using these variables, the pixel image can be partitioned as follows on partitioning iteration k, $d^{k+2}$ contiguous sets of rows of pixels, each set having $d^{\log_d r}-k-2$ rows, are formed from the first $d^{\log_d r}$ rows each. The remaining $r-d^{\log_d r}$ rows are also divided into contiguous sets of rows of pixels, each set having $d^{\log_d r}-k-2$ rows, except for the last set, which acts as a remainder set.

Figure 5A:
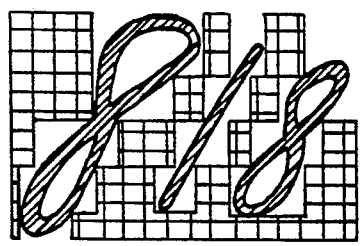
FIG. 5(a)-(b) are graphs showing partitioned street address images.
Figure 5B:
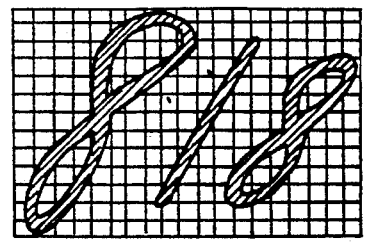

After calculation of the row partition, a vertical density histogram within each set of rows in the partition is created. The histogram, examples of which are shown in FIG. 5, represents the distribution of occupied and unoccupied columns within each set of rows. The histogram is created by vertically partitioning each set of rows in the row partition. If a column contains a foreground pixel, i.e., a pixel having binary value zero, it is marked occupied. If the column has no foreground pixel, it is marked unoccupied. FIG. 5(a) shows groups of unoccupied columns as gray rectangles.

Figure 11A:
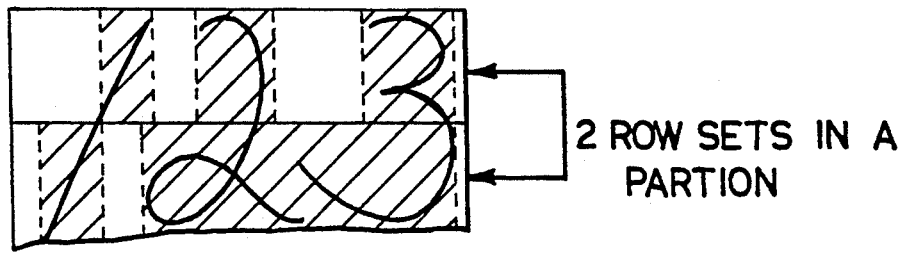
FIG. 11(a)-(c) shows a line adjacency graph representation of a character string.
Figure 11B:
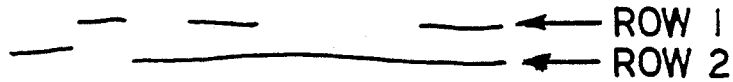
Figure 11C:
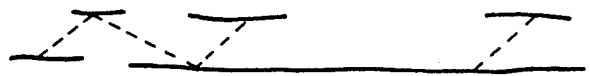

After vertical partitioning, a line adjacency graph of the occupied columns is created in preparation for performing a component analysis. A line adjacency graph (LAG) representation can be seen in FIG. 11(a)-(c). In FIG. 11(a), the shaded areas in each row partition indicate a separate run. In FIG. 11(b), the run lengths are represented as lines. The LAG procedure takes runs from adjoining groups of rows and connects them if they touch in an 8-connected fashion. The manner in which the characters in FIG. 11(a) are connected is shown schematically in FIG. 11(c). Each grouping of runs connected in this manner constitutes a component. As the number of rows in each set is reduced, (i.e., the number of partitions increases) the number of components increases. The number of groups of components is calculated and stored in a memory location as the value "left". "Left" is the number of components remaining in the image which have not been recognized.

REMOVAL OF DASHES

After partitioning, dashes are removed from the component list. Dashes are identified by searching the middle of the image for a long component, i.e., 2*height≦width, with the size of a dash (≦300 pixels) and that has a height of at most rows/4, where rows =number of rows in the image. If a component fitting this description is located, the dash is removed from the component list, and processing is performed on the remaining components in the list.

PROCESSING

Figure 3:
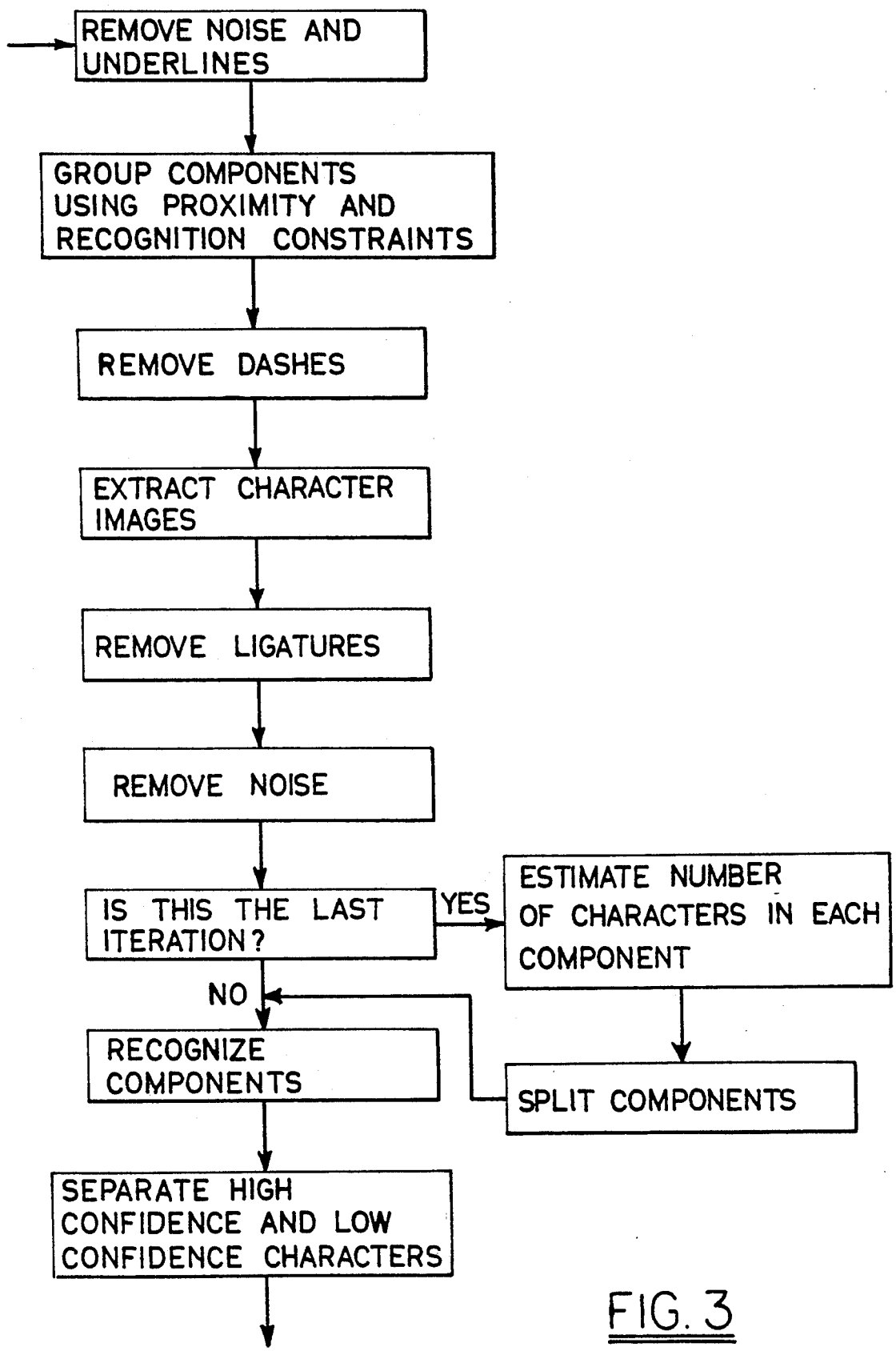
FIG. 3 is a more detailed flow diagram of the operation of components shown in FIG. 1.

After location of components, the components are processed. The processing operations are shown in FIG. 3.

First, non characters, i.e., selected punctuation symbols and noise, are removed from the pixel image. Such punctuation symbols include underlines, periods, commas, apostrophes and quotation marks. Dashes are not removed at this stage because they were removed before processing. Removal of these punctuation marks and noise is performed by blanking (converting to background) the foreground pixels representing them.

Undesired components are eliminated as follows. First, the average number of pixels in each component is determined. This number is divided by 2.3 and is labeled t. Next, if the number of pixels in a component is less than ⅛*t, and the component touches the edge of the image, then it is removed. Further noise can be removed by performing the following procedure. First, if the height of the component is greater than rows/4 and if 1.5*width<height, then the component is removed.

Underlines are removed in the following manner. If [((width of component>columns in image/height of component) or (bottom of component>¾*number of rows in image)) and (component height<number of rows in image/4) and (width of component/height of component>5)], then the component is removed.

Once noise, underlines and small punctuation marks have been removed, the method of the present invention requires that "broken" characters within the character string be grouped. A broken character is one that has a portion disconnected from its main body. See FIG. 6(a) and (c). For instance, the hat portion of the numeral 5 often is disconnected from the rest of the number, as is the left portion of the numeral 4. Character grouping aids the recognition process by reducing the number of non character components in the string.

Grouping is conducted by examining components in the string for their proximal relationships. Components are grouped if: 1) they satisfy a proximal relationship determined empirically to indicate a high probability of a disconnected component; and 2) if the resultant grouping yields a high probability that the grouped components form a character.

Figures 6A, 6B:
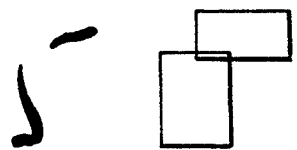
FIG. 6(a)-(d) are graphic depictions of grouping operations used to join disconnected characters.
Figures 6C, 6D:
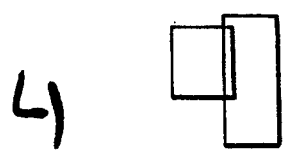

The determination of the proximal relationship is performed by enclosing the components in bounding boxes, as shown in FIG. 6(b) and (d). These bounding boxes define the proximity limits within which components must fall to indicate a high likelihood that the components actually form a single character.

Recognition is performed by a polynomial discriminant method, to be discussed below.

If the result of the proximal relationship test and the recognition test is positive, the components are grouped and the variable "left" is decremented by the number of such groupings performed.

Figure 12:
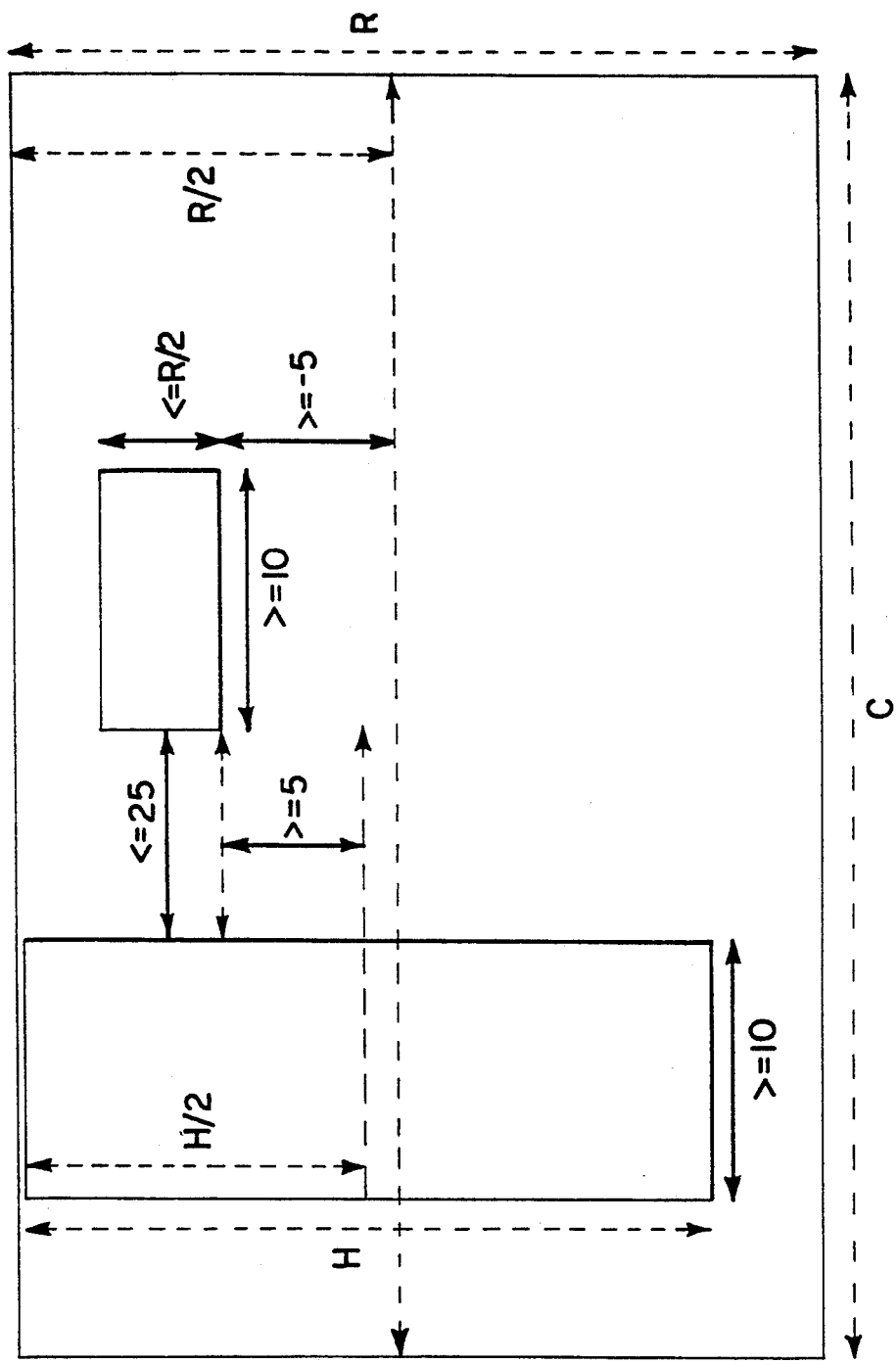
FIG. 12 is a graphic representation of the grouping criteria used to group a "5" disconnected from its hat.

The proximity criteria are shown in FIGS. 12-17. FIG. 12 shows the grouping criteria applied for grouping the disconnected components of the character "5". The dashed arrows represent reference parameters. The solid arrows represent each of the conditions which must be met before the grouping is carried out. Additionally, the resultant grouping must be recognized as a "5" with at least confidence 0.4 before grouping will be performed.

Figure 13:
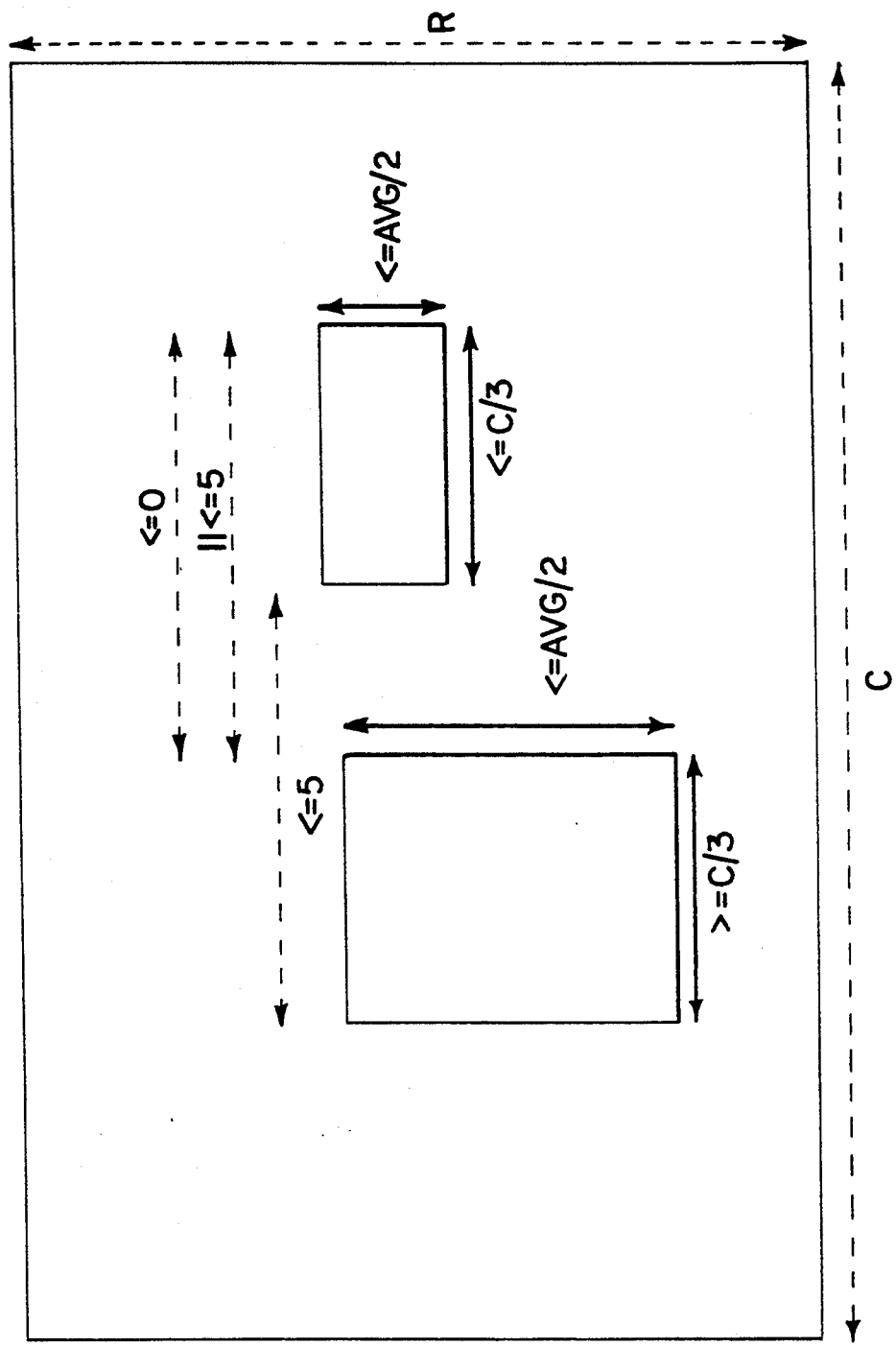
FIG. 13 is a graphic representation of the grouping criteria used to group small, broken components.

FIG. 13 shows a set of grouping criteria designed to group small broken components. One of the four conditions indicated by the solid arrows must be satisfied and one of the three conditions indicated by the dashed arrows must be satisfied before grouping. Additionally, the sum of the average number of run lengths in the two components must not exceed 2.7. Grouping of this sort is accepted if the recognition confidence is at least 0.4. This proximity constraint is applied to each component and the components to the left of it, and is iterated through all components in the string. This grouping technique is designed to group small, broken components.

Figure 14:
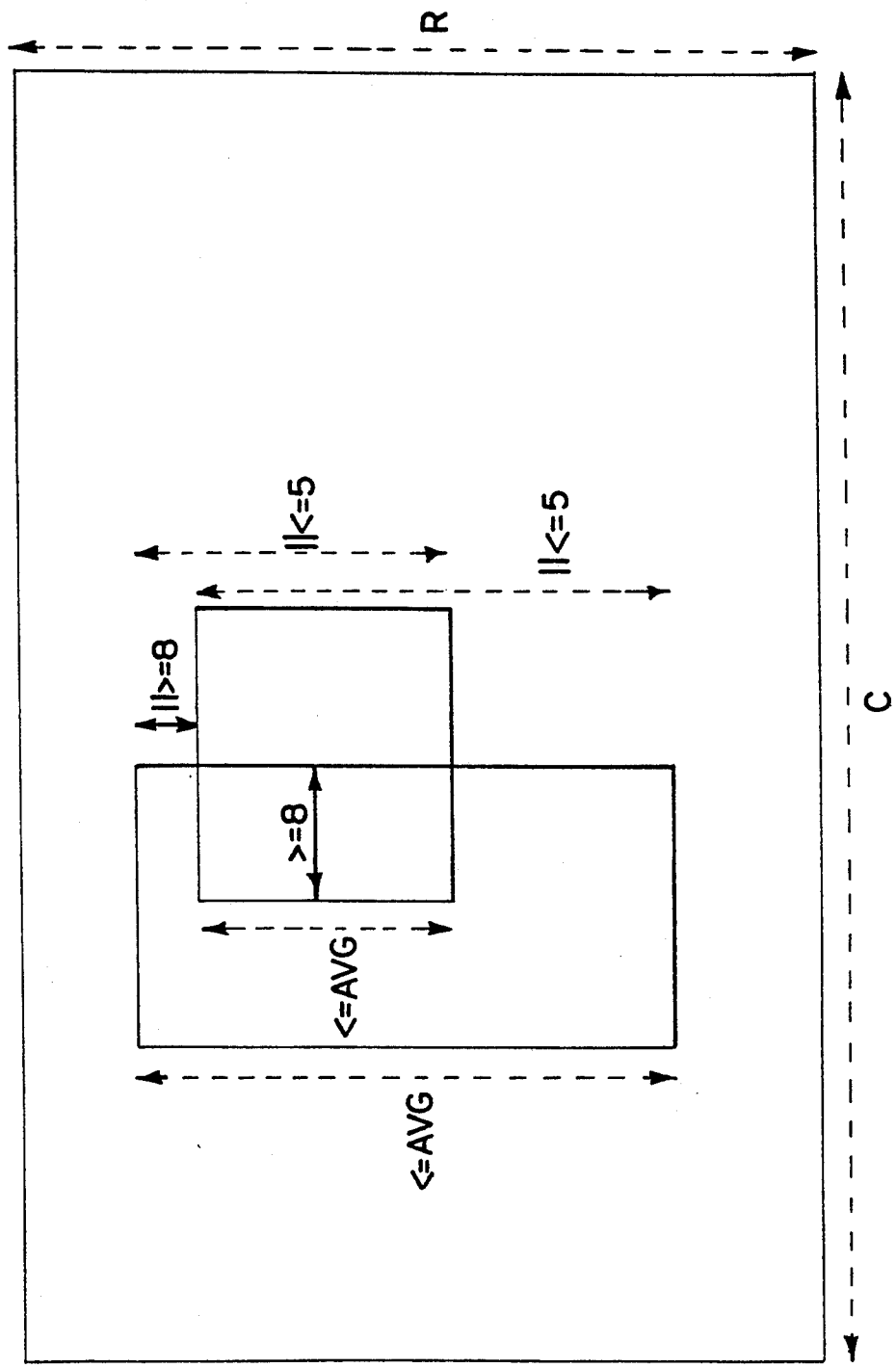
FIG. 14 is a graphic representation of the grouping criteria used to group enclosed components.

FIG. 14 shows a third type of grouping. This type of grouping is used for grouping enclosed components, i.e., small pieces of components enclosed within the bounding box of the parent (large portion) of a character. The grouping analysis is performed on each component and the component to the left of it. One of the conditions indicated by the two left most dashed arrows, one of the conditions indicated by the two rightmost dashed arrows, and the conditions indicated by the solid black lines in FIG. 14 must occur before grouping is performed. The horizontal run condition described with respect to FIG. 13 must also be met before grouping is performed. Groupings with a recognition confidence greater than 0.4 are accepted.

Figure 15:
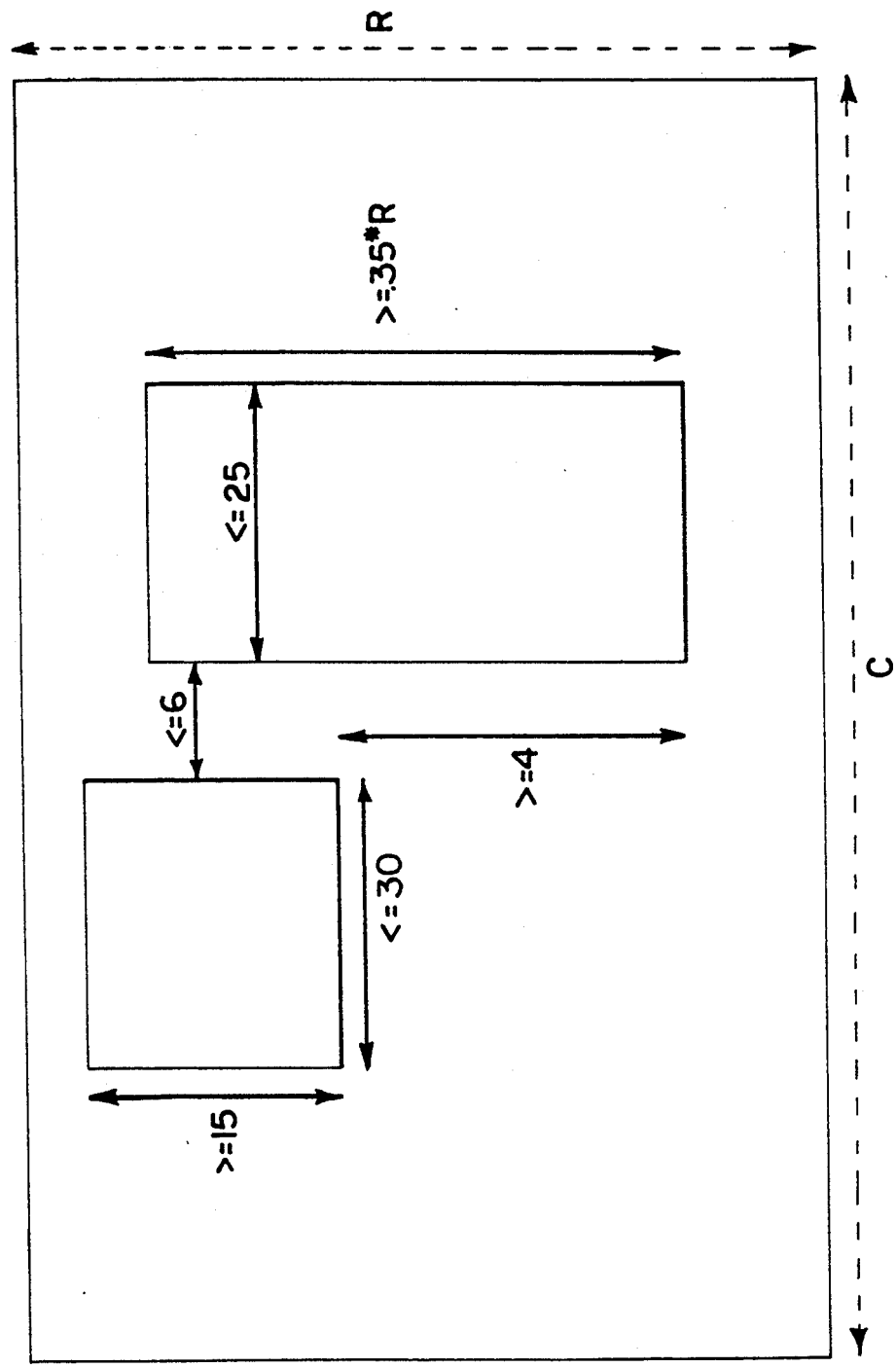
FIG. 15 is a graphic representation of the grouping criteria used to group disconnected 4's and 9's.

FIG. 15 shows the fourth grouping model, which is used for grouping disconnected 4's and 9's. This analysis is applied to every component and the component to the left of it. One grouping criterion is that either the width of the right component must be at least 25 pixels, or the right component is recognized with high confidence as a character. Additionally, the width of the left component must be less than or equal to both 30 pixels and 1.5 times the width of the right component. Further, the run length grouping criteria must be met in order for a grouping to occur. If the resultant group is recognized as a 4 or a 9 with at least 0.35 confidence, the group is accepted. Otherwise, the confidence must be at least 0.4 for the grouping to be accepted.

Figure 16:
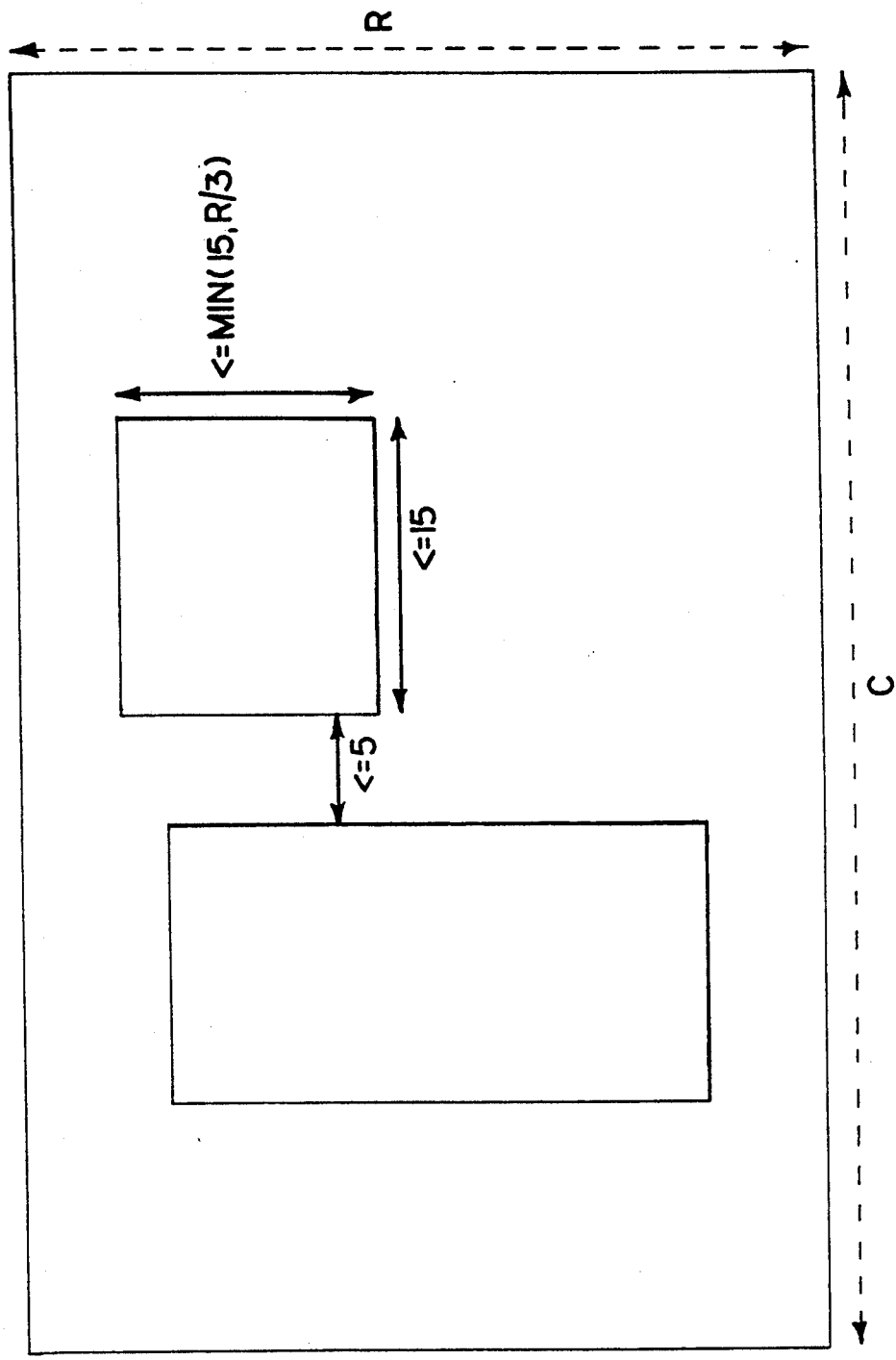
FIG. 16 is a graphic representation of the grouping criteria used to group large components that have smaller components to the right.

FIG. 16 shows a fifth grouping model. It is applied to each component and the component to its left. Three conditions must be met in order for grouping to occur. The first is that the components must be separated by at most 5 pixels. The second is a disjunction of: a) the width of the right component is at most 15 pixels; and b) the height of the right component minus half of the height of the left component is less than 2. The third condition requires that either the average number of pixels per row in the right component must not exceed 22 or that the following are satisfied jointly: (a) the height of the right component is less than or equal to min(15, R/3); and (b) the height condition mentioned in condition 2 above. This fifth grouping model groups large components that have smaller components to the right of them. In all cases, a 0.4 recognition confidence must be obtained before a grouping can occur.

Figure 17:
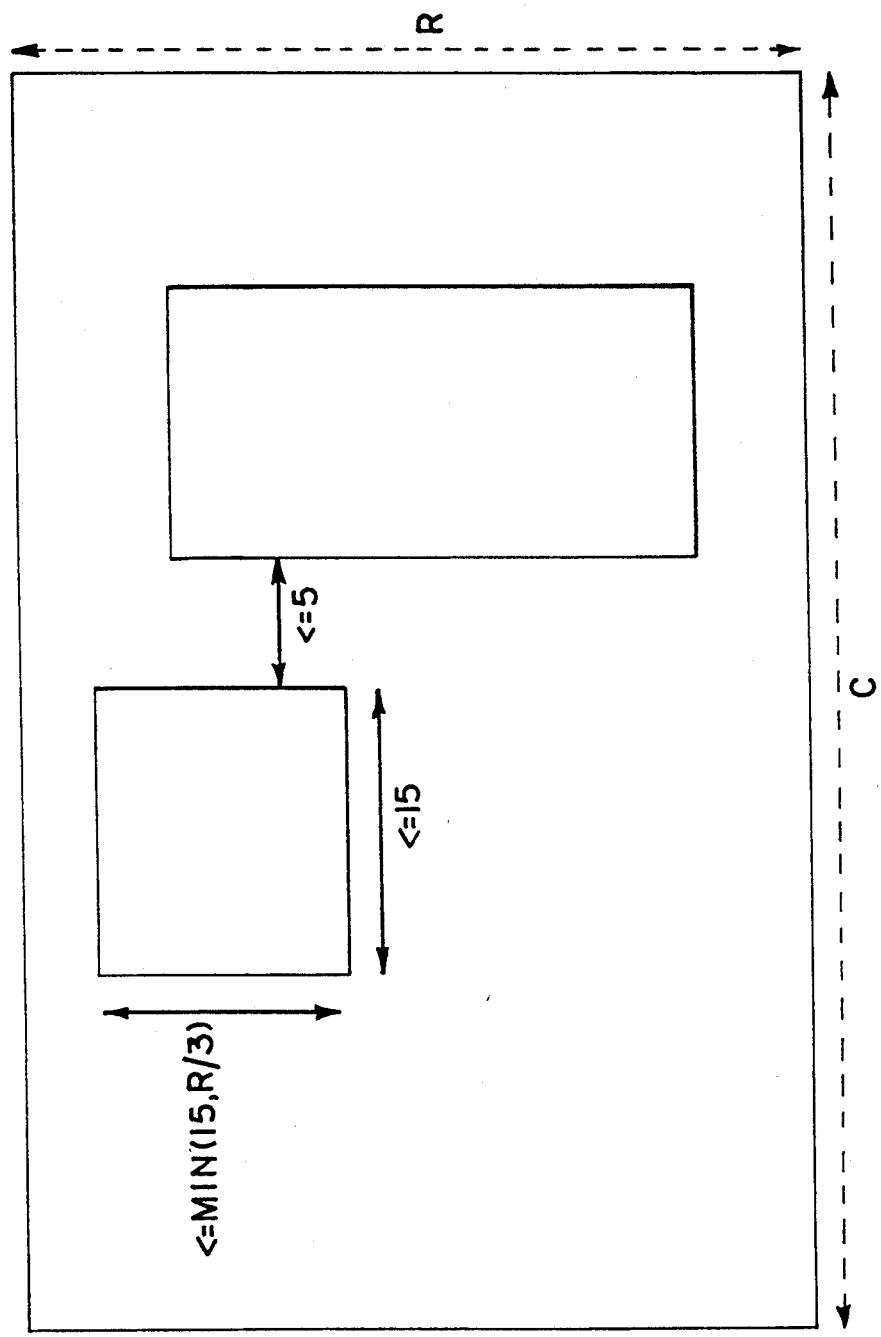
FIG. 17 is a graphic representation of the grouping criteria used to group large components that have smaller components to the left.

FIG. 17 shows a sixth grouping model. It is applied to each component and the component to its left. It is applied only when the left component has not been recognized as a 1 or a 5. The grouping criteria are exactly the same as the ones described in the fifth grouping model, except that the roles of the left and the right components are switched. Again, recognition confidence of at least 0.4 is needed in order to group.

After grouping broken characters, any dashes that were not previously removed (see Section III above) are removed now using the constraints as before. In the event that a dash is located, the dash is removed from the component list.

Once all dashes have been removed, the method of the present invention provides for the extraction of recognizable characters from the character string. On the first attempt at recognition of discrete characters within the string, each component is examined to determine whether its length and height characteristics indicate a high probability that the component is a single, isolated character.

After extraction of recognized character images, ligatures are removed from the remaining components. A ligature is an extraneous part of a character. For instance, common handwritten ligatures are shown in FIG. 9(a) and (b). Ligatures are recognized by taking a vertical projection of a character and locating columns in which only one vertical run occurs. Any noise not previously removed is also removed from the image at this point.

Next, the termination criteria are examined. The termination criteria are as follows. If the number of recognized characters, "found", plus the remaining unrecognized components, "left", equals the estimated total number of characters, "char", and at least 80% of the total characters ("char") have been recognized or this is the last iteration $K = \log_d \pi - 2$, then it is relatively certain that the correct characters have been found and the operation is terminated. In this case, the character images are collected in the output interface. Otherwise, if this is the last iteration and too many characters have been found, $K = \log_d \pi - 2$ and found $+$ left $>$ char, then segmentation is likely incorrect and the algorithm terminates. Lastly, if this is the last iteration, $K = \log_d \pi - 2$, and found $+$ left $<$ char, then additional characters must be located in the unsplit components.

If the termination criteria are not met, the components are subjected to recognition using a polynomial discriminant method (PDM), high confidence characters are separated from low confidence ones and the preceding steps beginning with calculating the row partition are repeated.

In a preferred embodiment of the present invention, PDM is used for digit and non digit character recognition. Before recognition begins, the binary image of each non-digit is thinned, such that the line constituting each has a width of roughly one pixel. No thinning is performed for digit recognition. The image (thinned, for non-digit recognition) then is normalized to a fixed height and width, preferably a $16 \times 16$ binary array using a technique known as "moment normalization." Moment normalization is a procedure whose goal is to shear and scale components into a slant normalized (i.e., upright) position in order to facilitate character recognition. This procedure is conducted as follows:

Let I be an image described by $I = \{(x,y)\}$. Further, let I have m rows and n columns. Moment normalization transforms I into a new image (with rows rows and cols columns) $I' = \{(x',y')\}$ via a transformation of the form:

$$[a\ b]\ [x] = [x']$$

$$[0\ c]\ [y]\ [y]$$

In the following discussion each summation is conducted for the foreground pixels in I. Background pixels do not figure into these equations. Parameters a, b and c are determined as follows. Let $$A = \Sigma 1$$

$$C_x = (\Sigma y)/A$$

$$C_y = (\Sigma x)/A$$

$$M_{xy} = (\Sigma(y - C_y)(x - C_x))/A$$

$$M_{yy} = (\Sigma(y - C_y)(y - C_y))/A$$

$$MAX = \text{maximum } \{(x - C_x) - (M_{xx}/M_{yy})^*(y - C_y)\}$$

$$MIN - \text{minimum } \{(x - C_x) - M_{xx}/M_{yy})^*(y - C_y)\}$$

Under these assumptions,
if $((\text{cols} - 3)/(MAX - MIN) > 1.6)$ then $a = \text{cols} - 3)/(MAX - MIN)$, otherwise $a = 2/(\text{length of longest horizontal run in I})$.
Then $$b = -(M_{xy}/M_{yy})^*a \text{ and } c = (\text{rows} - 3)/(m - 3)$$

In the preferred embodiment, rows $= 16$ and cols $= 16$. Thus, images are represented by an $N = 256 = 16 \times 16$ element binary column vector $v = (v_1, v_2, \ldots, v_n)^t$. This image vector and a predefined mapping $\rho$ are used to create an M element feature vector $x = \rho(v)$ of the form:

$X=(x_1, x_2, \ldots, x_M)=(1, v_1, v_2, \ldots, v_N, v_1v_2, \ldots, v_{M-1}v_M)^t$. The implementations do not use all possible quadratic features: the digit recognizer uses $M=1241$ and the character recognizer uses $M=2083$.

The feature vectors are used to discriminate K classes through the use of a K dimensional discriminant vector $d=(d_1, \ldots, d_K)$. Each of the K discriminant functions is a linear expression in the components of x, $d_i = a_{i1}x_1 + \ldots + a_{iM}x_M, i=1, \ldots, K$, and thus, a quadratic expression in the components of v. The discriminant vector d can therefore be written as $d=A^tx$ where A is a M x K matrix whose $i^{th}$ column, $i=1, \ldots, K$, consists of the elements $d_i = a_{i1}x_1 + \ldots + a_{iM}x_M, i=1, \ldots, K$. In the digit recognition case, K is set to 10, and in the non digit recognition case K is set to 52.

To obtain the coefficient matrix A, the least mean-square error approach is used. Under the assumption that C training characters are available, a $C \times K$ objective matrix Y is defined as $Y=(y_1, \ldots, y_K)^t$, where $y_i$ is a binary vector indicating class membership in class i. Similarly, let X be a $C \times M$ matrix such that row vector j equals x, the feature vector of the $j^{th}$ training image. The training proceeds by minimizing the mean square deviation between the actual class membership matrix Y and the estimated class membership matrix given by XA. The minimization of $\{||Y-XA||\}$ leads to the requirement that $E\{XX^t\}A=E\{XY^t\}$; this equation follows as a necessary condition for minimizing the Euclidean norm. Consequently, the coefficient matrix A can be probabilistically approximated by $A=(XX^t)^{-1}XY^t$.

After the coefficient matrix A is computed, the polynomial discriminant function can be evaluated for a test image, v. This evaluation consists of calculating the discriminant vector d and choosing the class corresponding to the largest component in this vector.

If a match of suitably high probability is found, the character is removed from the string by changing foreground pixels to background and storing the character's identity and position within the word in memory. If one or more characters is removed in this fashion, the variable "found" is decremented by the number of characters removed.

If termination criteria are met, i.e., this is the last iteration, and splitting is required, the number of characters remaining in each remaining component is estimated using the following operations. Let $prod_i$ be the product of the number of pixels in component i and the normalized width of component i. The normalized width is the component calculated by normalizing the component height to 40 pixels and maintaining a constant aspect ratio. The list of $prod_i$ values are sorted into increasing order. The component corresponding to $prod_0$ is the most likely component to contain multiple characters (since it has the greatest normalized width). The number of characters in this component is incremented by one until one of the following three conditions holds:

1) the targeted number of characters has been accounted for, the targeted number being the number of characters estimated during the pre processing stage;
2) $prod_0$ divided by the number of characters in the component is less than $prod_1$; or
3) the average number of runs per row plus 0.15 is less than or equal to the currently estimated number of characters in this component.

The first condition terminates the estimation period. The second condition implies division of the original product associated with $prod_0$ by the number of characters, resortation of the list, and reiteration of this process. In the last case, the component cannot contain additional characters, so it is not considered any further; however, other components may still be considered.

Once the number of characters in the remaining components has been estimated, the components containing multiple characters are split. The splitting procedure involves locating splitting points within those components having a high probability of containing multiple characters.

Figure 4:
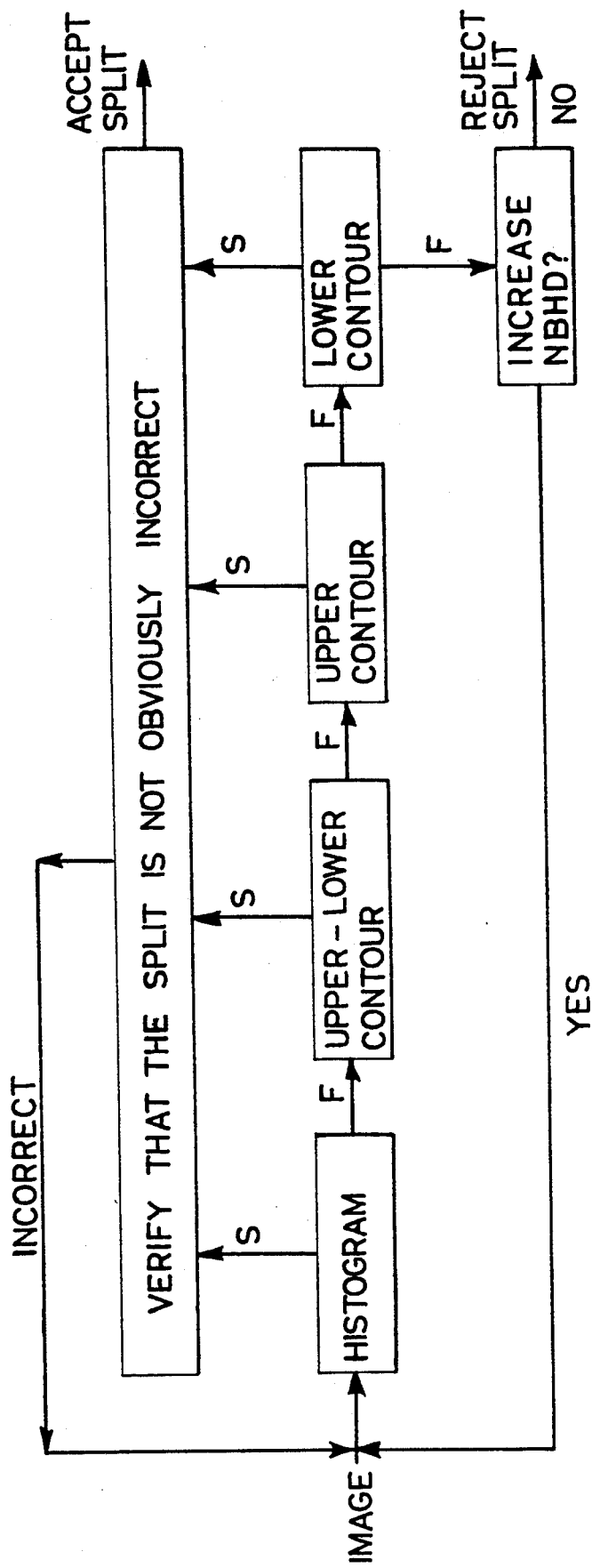
FIG. 4 is a flow diagram of the component processing operation for splitting overlapping characters.

In a preferred embodiment of the present invention, there can be four ways to split the components. Each of these is attempted until a proper split can be made. The four ways involve histograms, upper lower contours, upper contours and lower contours. These are illustrated in FIG. 7. A flow chart of the splitting strategy is shown in FIG. 4. Examples of the results of splitting are shown in FIG. 8.

Splitting begins by locating likely splitting points, that is, locating splitting neighborhoods. This is done by dividing the number of pixel columns by the estimated number of characters contained in the components. The initial splitting points will be centered at columns which are multiples of the result of this division. If, after the four splitting methods have been conducted, the splitting point is found to be inaccurate, the neighborhood in which the splitting can occur can be expanded.

Figure 7A:
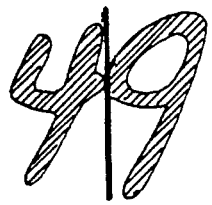
FIG. 7(a)-(d) are graphic depictions of splitting operations in accordance with the present invention.

Using the histogram, the vertical density of each column in the neighborhood of the estimated split is considered and the column containing the fewest number of foreground pixels is designated as a splitting candidate. If such a minimum is found, the split line is the column occupied by the fewest pixels. However, a split will be made only if the column has a predetermined pixel profile, that profile being that the column is the right most column having a vertical run length of one. This operation is illustrated in FIG. 7(a).

Figure 7B:
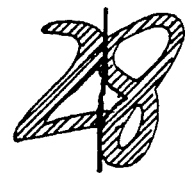

Using the upper-lower contour, shown in FIG. 7(b), which is attempted if the histogram fails to produce an acceptable split, the upper and lower contours of the component are identified. The upper contour is defined by the upper most foreground pixel in each column in the splitting neighborhood. In like fashion, the lower contour is defined by the lower most foreground pixel in each column of the component in the neighborhood of the split. The splitting line is identified by determining the lowest occurring foreground pixel in the upper contour in the neighborhood of the estimated split and the uppermost foreground pixel in the lower contour in the same neighborhood. The split is made by connecting the valley and the peak with a dissecting line. If no peak or valley can be found, this technique will fail and the next splitting techniques will be attempted.

Figure 7C:
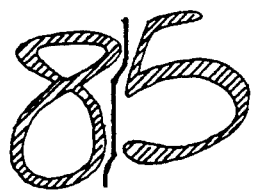

Using the upper contour, shown in FIG. 7(c), valleys in the upper contour are examined in the estimated neighborhood of the split and the minimum point in the valley is located. The current point is assigned as the minimum point. If the current point is a foreground pixel, then it is a pixel on the split line and the pixel immediately below the current point becomes the current point. If the pixels immediately to the left and right of the current point are either both foreground or both background, the current point is part of the split line and the pixel directly below the current point becomes the current point. If neither of these conditions holds, the adjacent foreground pixel becomes the current point. The process continues until the lower edge of the component is reached.

Figure 7D:
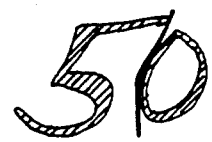

The lower contour operation is essentially the same as the upper contour operation, the difference being that the lower contour operation begins from the highest point of the lower contour of the image in the splitting neighborhood and proceeds upward until the split is made. The lower contour operation is illustrated in FIG. 7(d).

After each split is made, it is verified to be not obviously incorrect. To make sure a cut is not obviously incorrect, it must be shown that the height of the resulting left and right pieces are at least 0.4*R, where R is the number of rows in the component.

If none of the splitting methods is able to produce a satisfactory split, the neighborhood centered around the estimated split points can be expanded and the four splitting methods repeated.

The recognition procedure is then once again performed. That is, the components having a high probability of being characters based upon their aspect ratios are recognized and if highly probable of being a character, the character is removed. If not highly probable of being a character, the component remains in the string.

After the foregoing processing steps have been performed, the number of characters in the string is reestimated using the technique of constrained linear regression.

The technique of constrained linear regression used to estimate the number of remaining characters relies on information gathered during prior recognition steps. The procedure does this by using image density (defined as F/T, where F is the number of foreground pixels and T is the image size) as the independent variable and the number of characters recognized as the dependent variable. As characters were removed during the preceding recognition steps, their contribution to the density of the entire image was determined.

The density of the character "1" is weighted, since the density of the character "1" is much less than that of other characters, in order that an accurate estimate of the number of remaining characters can be obtained. The weight for a "1" is 1.8.

The foregoing operations represent one iteration of the recognition procedure. If components in the original image were not recognized and removed during the preceding steps, they are segmented into a number of components representing a re estimated string length. This character re-estimation step is performed using constrained linear regression.

Figure 10:
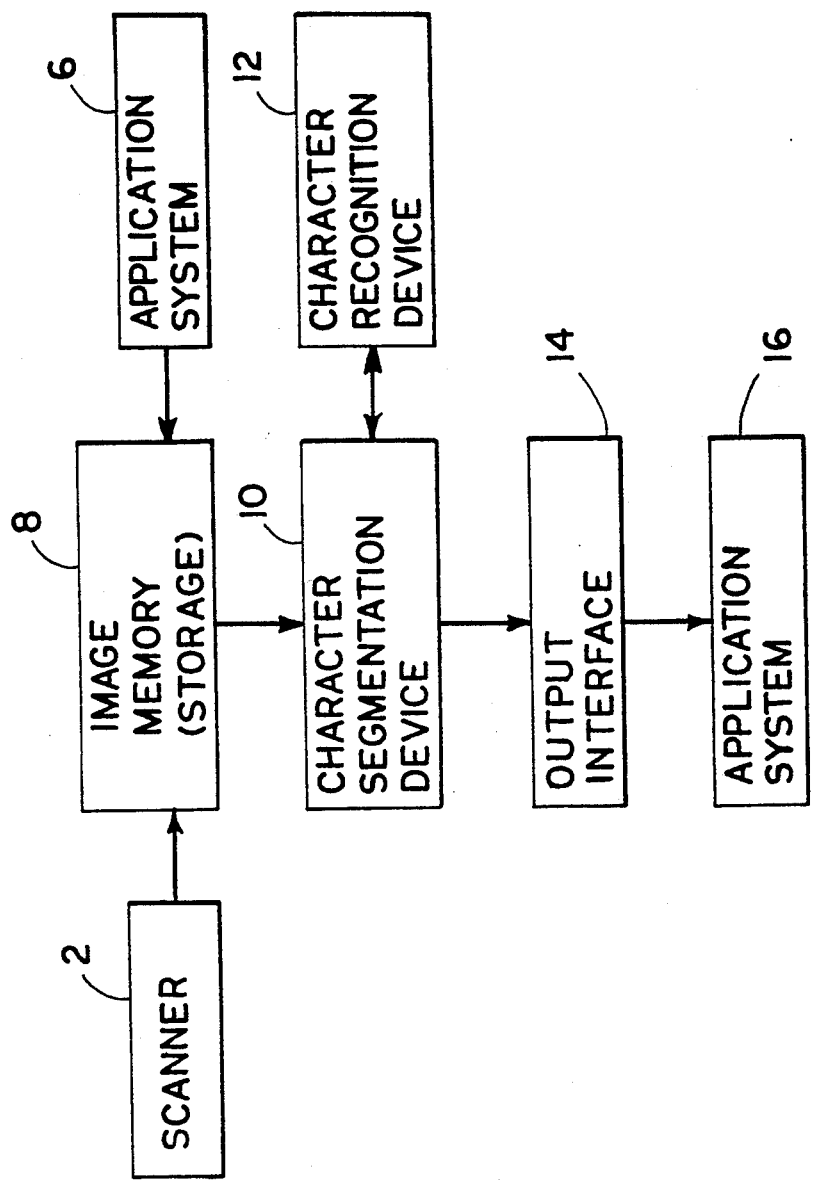
FIG. 10 is a block diagram of hardware incorporating the system depicted in FIGS. 1-4.
Figure 18:
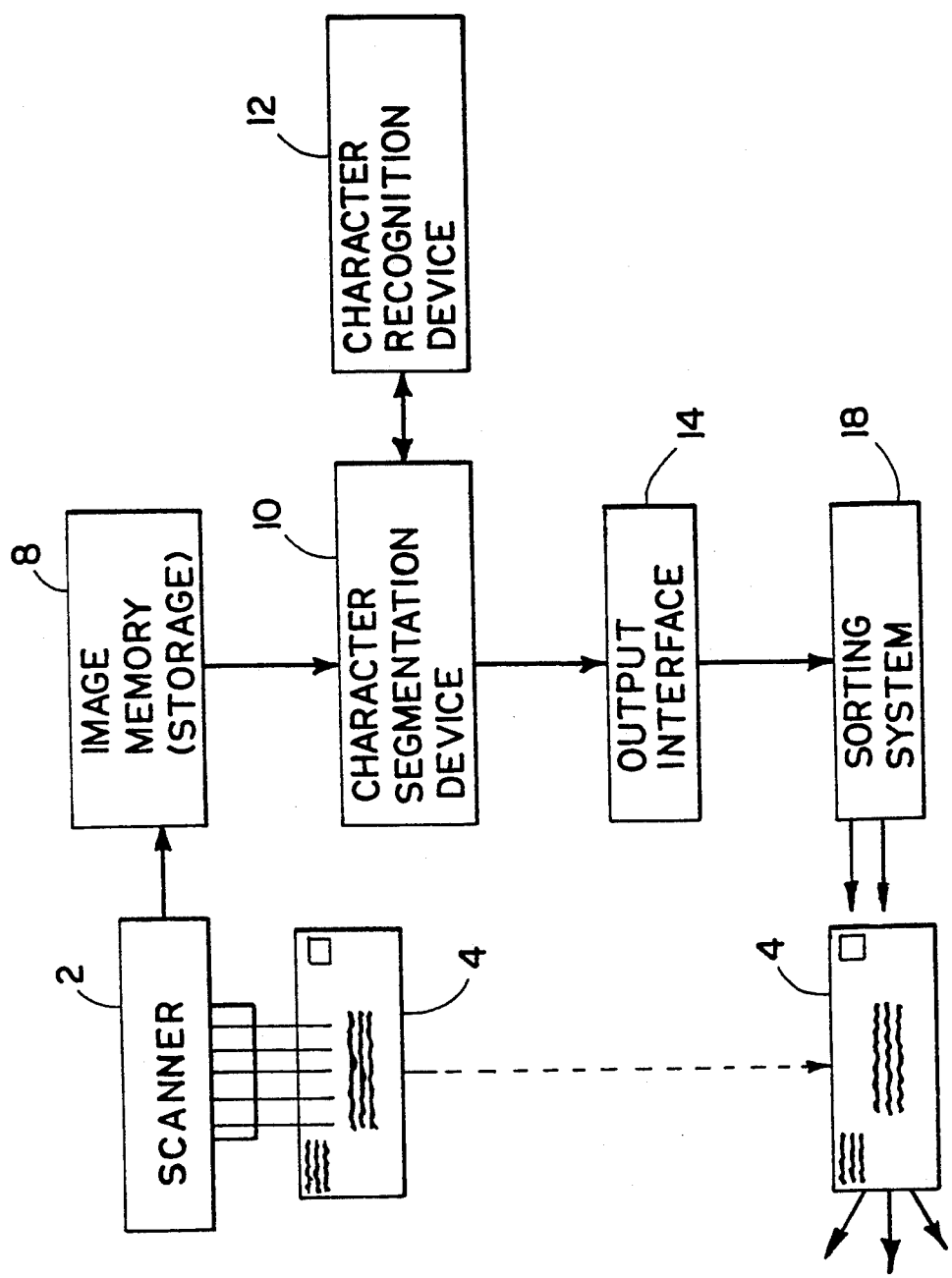
FIG. 18 is a block diagram of a mail sorting apparatus which implements the method of the present invention.

The system of the present invention can be implemented in accordance with the block diagrams of FIGS. 10 and 18. As can be seen, a digital representation of the image can be created by a scanner (which can scan a mail piece 4, for instance), or digital information representing the image can be created in an external application system 6. The image is then stored in a suitable memory storage device 8. The stored image can then be accessed by the character segmentation device 10, which can be either specialized hardware or a general purpose computing platform. The segmented characters are then processed by the recognition device 12, which, too, can be either specialized hardware or a general purpose computing platform. The results of recognition and segmentation can then pass through an output interface 14, which can be a data bus connecting the system of the present invention with a system, for example, for processing checks, processing credit card data or sorting mail. Alternatively, output interface 14 can be software responsive to data from the system of the present invention. Finally, the results can be applied to an application system 16, such as a mail piece sorting system 18 in FIG. 18.

EXAMPLE

The successful operation of the system discussed herein is indicated by a satisfactory segmentation rate. Satisfactory segmentation is achieved if each of the written characters in a string is correctly isolated. Correct isolation occurs if either the true character identity results from the recognition procedure or the character image contains all components belonging to the character in the original image and no artifacts from splitting.

Four sets of test imagery were used to test the proposed system. Each of the sets was scanned at a 300 pixels per inch sampling rate and each set contained broken and connected characters. The first set, Bs—ZIPs, contained manually cropped ZIP Codes and ZIP+4 Codes while the second set, Bc—street, contained manually cropped street numbers. Both of these sets were used in training and testing. The last two sets, Street—dig and Street—char, contained the street numbers from 500 images as located by the system described in E. Cohen, J. Hull and S. Srihari, "Reading and Understanding Handwritten Addresses," Fourth USPS Advanced Technology Conference, November 1990, pp. 821-836. The Street—dig set encompasses all candidates composed solely of digits and Street—char encompasses the remaining candidates. As a result, Street—char images exhibit a mixture of discretely written text, cursive text, and noise.

The results of four tests are presented in Table II. The first two columns contain the test set name and number of images in the set while the third column presents the range of word lengths represented in the data set. The fourth column states the satisfactory segmentation rate when using the algorithm in the word length estimating mode. Column five contains the number of unsatisfactorily segmented images which resulted in incorrect word length and column six shows the number of these segmentations that differ from the true word length by at most one. The last two columns will be explained below.

TABLE II

| Test Set | Total Images | Word Length Range | Statis Rate | Length Errors | ±1 Nhd | Recover | Statis Rate 2 |
|---|---|---|---|---|---|---|---|
| Bs—ZIPs | 500 | 5,9 | 89.6 | 35 | 34 | 23 | 94.4 |
| Bc—street | 206 | 1–6 | 92.7 | 13 | 12 | 8 | 96.7 |
| Street—dig | 176 | 1–6 | 94.3 | 7 | 7 | 4 | 97.6 |
| Street—char | 101 | 1–6,8–10,12 | 62.4 | 33 | 27 | 9 | 70.3 |

The satisfactory segmentation rate listed in the fourth and eighth columns of Table II is one hundred times the number of satisfactory segmentations divided by the total number of segmentations.

The first two sets of results display high satisfactory rates, which imply high performance of word length estimation. These results, although not unexpected from the training sets, prove interesting because words segmented into the incorrect number of characters nearly always contain exactly one less or one more character. Taking advantage of this observation, a second level of segmentation could complement the first segmentation. In fact, if all words suffering from incorrect word length estimation are segmented by forcing the number of digits to one more and one less, then 96% of the incorrect segmentations can be "recovered," as indicated in column seven of Table II. The last column in Table II shows the satisfactory rate under the assumption that the three segmentations can be combined with 100% efficiency. Development of such a combination method could utilize recognition confidences and heuristics based on digit and character size.

The results of the Street_char test are lower due to the presence of cursive text and suboptimal performance of character recognition. Of the length estimation errors that are not recoverable, over 70% of the difficulties stem from cursive text, which is very difficult to recognize. In addition, although many characters were discretely written, they were written in a cursive type font. Lower recognition rates are achieved on such characters because the character PDM was trained on printed characters only. Sixteen of the unsatisfactory segmentations are directly caused by poor character recognition and many of these cases involved a street number with a post directional character that was split into two pieces because character recognition did not recognize the character. Digit recognition posed no difficulties within these words. In conclusion, higher satisfactory recognition rates can be achieved on alphanumeric words with more general character recognition and more robust methods to handle cursive text.

From the foregoing description, it will be apparent that there has been provided an improved system for handwritten character recognition. While the above method and apparatus have been described with reference to the recognition of Latin characters and Arabic numerals the method and apparatus can be used in systems for recognizing Arabic, Cyrillic, Greek, Hebrew, Kanji and other predefined characters. Other variations and modifications in the herein described system, within the scope of the invention, will undoubtedly suggest themselves to those skilled in the art. Accordingly, the foregoing description should be taken as illustrative and not in a limiting sense.

We claim:

1. A method of recognizing characters in a string of handwritten text, comprising the steps of:
   (a) providing an array of pixels corresponding to said string;
   (b) estimating the number of characters contained in said string;
   (c) partitioning said array into a plurality of groups of rows of said pixels;
   (d) vertically partitioning each of said groups of rows in order to separate occupied columns within each of said groups of rows from unoccupied columns, said columns being occupied if they contain a foreground pixel and being unoccupied if they contain no foreground pixel;
   (e) designating as a component a plurality of said columns having a foreground pixel if said plurality is contiguous, said component thereby forming a discrete pattern;
   (f) removing non-character components from each of said groups of rows;
   (g) recognizing said discrete patterns as characters;
   (h) removing from said array said recognized discrete patterns having a predetermined confidence level of corresponding to one of said characters; and
   (i) reestimating said number of characters contained in said string to obtain a reestimated number of characters.

2. The method according to claim 1, further comprising repeating said steps (c)-(i) a predetermined number of times or until a predetermined percentage of said estimated number of characters is recognized, whichever occurs first.

3. The method according to claim 2, further comprising estimating a number of characters contained in each component and splitting ones of said components not recognized as one of said characters if said splitting is highly probable of yielding a character, said unrecognized components being split such that the resulting number of characters equals said reestimated number of characters.

4. The method according to claim 1, wherein said reestimating is performed using constrained linear regression.

5. The method according to claim 1, wherein said recognizing said discrete patterns is performed using a polynomial discriminant method.

6. The method according to claim 1, further comprising removing ligatures from said string.

7. The method according to claim 1 wherein said providing an array of pixels corresponding to said string comprises:
   optically scanning said string to create a pixel image of said string; and
   thresholding said pixel image to create a bit map of said string.

8. The method according to claim 1 wherein said estimating the number of characters contained in said string comprises:
   determining the vertical length of said string;
   determining the horizontal length of said string; and
   determining said estimated number of characters from the ratio of said vertical length to said horizontal length.

9. The method according to claim 1, wherein said removing non-character components from each of said groups comprises:
   changing to background pixels each of said foreground pixels forming a non character component.

10. The method according to claim 1 further comprising:
    after said removing non-character components, grouping components in accordance with predetermined proximity criteria.

11. The method according to claim 1 wherein said splitting comprises:
    locating one or more splitting neighborhoods in said components wherein said splitting neighborhoods are one or more points in said string where adjoining characters intersect;
    counting the number of said foreground pixels in each of said columns having a foreground pixel in each of said splitting neighborhoods; and
    separating each of said components at a column having a predetermined foreground pixel profile.

12. The method according to claim 11, wherein said predetermined pixel profile comprises a right-most column not having two or more of said foreground pixels.

13. The method according to claim 3 wherein said splitting comprises:
   locating one or more splitting neighborhoods in said components;
   identifying an upper contour of each of said components by locating an uppermost foreground pixel in each column of said component in each of said splitting neighborhoods;
   identifying a lower contour of each of said components by locating a lower most foreground pixel in each column of said component in each of said splitting neighborhoods; and
   separating each of said components on a line generally between a lower most foreground pixel in said upper contour and an uppermost foreground pixel in said lower contour in each of said splitting neighborhoods.

14. The method according to claim 3 wherein said splitting comprises:
   locating one or more splitting neighborhoods in said components;
   identifying an upper contour of each of said components by locating an uppermost foreground pixel in each column of said component in each of said splitting neighborhoods; and
   separating each of said components on a line including a lower most foreground pixel in said upper contour in said splitting neighborhoods.

15. The method according to claim 3 wherein said splitting comprises:
   locating one or more splitting neighborhoods in said components;
   identifying a lower contour of each of said components by locating a lower-most foreground pixel in each column of said component in each of said splitting neighborhoods; and
   separating said components on a line including an uppermost foreground pixel in said lower contour in each of said splitting neighborhoods.

16. The method according to claim 11 wherein said locating comprises:
   dividing the number of pixel columns in said component by said estimated number of characters to form a neighborhood multiplier;
   designating as a splitting neighborhood a group of said pixel columns centered at a pixel column whose location corresponds to a multiple of said neighborhood multiplier;
   counting foreground pixels in each column of pixels within said component; and
   assigning as a split point of column of pixels having the fewest number of foreground pixels.

17. The method according to claim 13 wherein said locating further comprises:
   dividing the number of pixel columns in said component by said estimated number of characters to form a neighborhood multiplier;
   designating as a splitting neighborhood a group of said pixel columns centered at a pixel column corresponding to a multiple of said neighborhood multiplier;
   identifying an upper contour of said foreground pixels in said components;
   identifying a lower contour of said foreground pixels in said components
   locating a low point on said upper contour in each of said neighborhoods;
   locating on said lower contour a high point in each of said neighborhoods;
   separating said components generally along a line between said high and low point in one of said neighborhoods.

18. The method according to claim 14 wherein said locating further comprises:
   dividing the number of pixel columns in said component by said estimated number of characters to form a neighborhood multiplier;
   designating as a splitting neighborhood a group of said pixel columns centered at a pixel column corresponding to a multiple of said neighborhood multiplier;
   identifying an upper contour of said foreground pixels;
   locating a low point on said upper contour in each of said neighborhoods, said low point being a split point.

19. The method according to claim 15 wherein said locating further comprises:
   dividing the number of pixel columns in said component by said estimated number of characters to form a neighborhood multiplier;
   designating as a splitting neighborhood a group of said pixel columns centered at a pixel column corresponding to a multiple of said neighborhood multiplier;
   identifying a lower contour of said foreground pixels; and
   locating a high point on said lower contour in each of said neighborhoods, said high point being a split point.

20. The method according to claim 1, further comprising:
   when said estimation of the number of characters is incorrect, changing said estimation to be one less than said incorrect estimation and repeating the steps of claim 1.

21. The method according to claim 1, further comprising:
   when said estimation of the number of characters is incorrect, changing said estimation to be one more than said incorrect estimation and repeating the steps of claim 1.

22. The method according to claim 1, further comprising grouping ones of said components if they satisfy a predetermined proximal relationship.

23. Apparatus for recognizing characters in a string of handwritten text, comprising:
   means for providing a patterned array of pixels corresponding to said string;
   means for estimating the number of characters contained in said string;
   means for partitioning said array into a plurality of groups of rows of said pixels;
   means for vertically partitioning each of said groups of rows to separate occupied columns within each of said groups of rows from unoccupied columns, said columns being occupied if they contain a foreground pixel and being unoccupied if they do not contain a foreground pixel;
   means for removing non-character components from each of said groups of rows;
   means for designating as a component a plurality of said columns having a foreground pixel if said plurality is contiguous, said component thereby forming a discrete pattern;

means for recognizing said discrete patterns as characters;

means for removing from said array ones of said components having a predetermined confidence level of forming a character; and means for reestimating said number of characters contained in said string to obtain a reestimated number of characters.

24. The apparatus according to claim 23, wherein said means for reestimating uses constrained linear regression.

25. The apparatus according to claim 23, wherein said means for recognizing uses a polynominal discriminant method.

26. The apparatus according to claim 23, further comprising:

means for estimating the number of characters in one of said components;

means for splitting into a predetermined number of characters ones of said components not recognized as one of said characters if said unrecognized components can be split to yield highly probable characters, said predetermined number of characters depending on the estimated number of characters in said string;

means for recognizing said split components as characters;

means for removing from said array each of said split components having a predetermined confidence level of forming one of said characters; and means for grouping ones of said components satisfying a predetermined proximal relationship.

27. Apparatus for recognizing characters in a string of handwritten text, comprising:

means for providing a patterned array of pixels corresponding to said string;

means for estimating the number of characters contained in said string;

means for partitioning said array into a plurality of groups of rows of said pixels;

means for vertically partitioning each of said groups of rows to separate occupied columns from unoccupied columns, said columns being occupied if they contain a foreground pixel and being unoccupied if they do not contain a foreground pixel;

means for removing non-character components from each of said groups of rows;

means for designating as a component a plurality of said columns having a foreground pixel if said plurality is contiguous, said component thereby forming a discrete pattern;

means for recognizing said discrete patterns as characters;

means for removing from said array ones of said components having a predetermined confidence level of forming a character;

means for reestimating said number of characters contained in said string to obtain a reestimated number of characters; and means for recognizing a word comprising said recognized characters.

28. The apparatus according to claim 27, further comprising:

means for estimating the number of characters in one of said components;

means for splitting into a predetermined number of characters ones of said components not recognized as one of said characters if said unrecognized components can be split to yield highly probable characters, said predetermined number of characters depending on the estimated number of characters in said string;

means for recognizing said split components as characters;

means for removing from said array each of said split components having a predetermined confidence level of forming a character; and means for grouping ones of said components satisfying a predetermined proximal relationship.

29. The apparatus according to claim 27, further comprising means for sorting a mail piece on which said words are written in response to the results of said recognition.

* * * * *